United States Patent
Balasubramanian et al.

(10) Patent No.: US 8,078,817 B2
(45) Date of Patent: Dec. 13, 2011

(54) METHOD AND SYSTEM FOR SECURED DRIVE LEVEL ACCESS FOR STORAGE ARRAYS

(75) Inventors: Sridhar Balasubramanian, Wichita, KS (US); Kenneth Hass, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 740 days.

(21) Appl. No.: 12/072,643

(22) Filed: Feb. 27, 2008

(65) Prior Publication Data

US 2009/0216979 A1    Aug. 27, 2009

(51) Int. Cl.
*G06F 12/00*    (2006.01)
*G06F 13/00*    (2006.01)

(52) U.S. Cl. ......... 711/163; 711/100; 711/154; 711/170

(58) Field of Classification Search .................. 711/100, 711/113, 114, 115, 116, 154, 163, 170
See application file for complete search history.

(56) References Cited

U.S. PATENT DOCUMENTS

| | | | | |
|---|---|---|---|---|
| 5,432,950 A * | 7/1995 | Sibigtroth | ..................... | 711/163 |
| 7,246,213 B2 * | 7/2007 | Gardner | ........................ | 711/163 |
| 7,502,946 B2 * | 3/2009 | Perkins et al. | ................. | 713/193 |
| 2008/0082772 A1 * | 4/2008 | Savagaonkar et al. | ........ | 711/163 |
| 2008/0250217 A1 * | 10/2008 | Kershaw et al. | .............. | 711/163 |

* cited by examiner

*Primary Examiner* — Tuan V. Thai

(74) *Attorney, Agent, or Firm* — Suiter Swantz pc llo

(57) ABSTRACT

The present disclosure provides a methodology by which disk level access for storage drives of a storage array may be highly secured based on permission settings applied to the driver interface of the storage drives. Based on specific set of access rules, a security component applies security profiles to permit/deny access to an individual storage drive, sets the storage drive with a first security level, monitors for a triggering event, and sets the storage drive to a second (more restrictive) security access level in response to the triggering event. In addition, the security component generates an alert in response to the triggering event. Thus, disk level access permissions are applied at a driver interface layer and permissions are applied based on administrator-defined policies. The present disclosure provides for complete lock-down of data permissions, management and/or restriction of IO loads, and protection of "read-only" data integrity from overwrites.

20 Claims, 4 Drawing Sheets

| SDI Security Level | Description |
|---|---|
| None | Access to all SDI functions is prohibited. |
| Restricted | Access to some SDI functions (e.g., reads) is allowed; access to others (e.g., writes) is prohibited. |
| Limited | Access to some SDI functions (e.g., reads and firmware downloads) is allowed; access to others (e.g., writes) is prohibited. |
| Full | Access to all SDI functions allowed. |

*FIG. 2*

| SDI Function | Timeout | Minimum Required Security Level |
|---|---|---|
| SDI_GET_DRIVER_INFO | SDI_ALL_TIMEOUT | Restricted |
| SDI_GET_CNTLR_CONFIG | SDI_ALL_TIMEOUT | Restricted |
| SDI_GET_CNTLR_STATUS | SDI_ALL_TIMEOUT | Restricted |
| SDI_FIRMWARE_DOWNLOAD | SDI_ALL_TIMEOUT | Limited |
| SDI_GET_RAID_INFO | SDI_RAID_TIMEOUT | Restricted |
| SDI_GET_RAID_CONFIG | SDI_RAID_TIMEOUT | Restricted |
| SDI_GET_PHY_INFO | SDI_TIMEOUT | Restricted |
| SDI_SET_PHY_INFO | SDI_TIMEOUT | Full |
| SDI_GET_LINK_ERRORS | SDI_TIMEOUT | Restricted |
| SDI_SMP_PASSTHROUGH | SDI_TIMEOUT | See Function Definition |
| SDI_SSP_PASSTHROUGH | SDI_TIMEOUT | See Function Definition |
| SDI_STP_PASSTHROUGH | SDI_TIMEOUT | See Function Definition |
| SDI_GET_SATA_SIGNATURE | SDI_TIMEOUT | Restricted |
| SDI_GET_OS_ADDRESS | SDI_TIMEOUT | Restricted |
| SDI_GET_SAS_ADDRESS | SDI_TIMEOUT | Restricted |
| SDI_TASK_MANAGEMENT | SDI_TIMEOUT | Full |
| SDI_GET_CONNECTOR_INFO | SDI_TIMEOUT | Restricted |
| SDI_PHY_CONTROL | SDI_TIMEOUT | Full |

*FIG. 3*

| SDI Security Level | Windows Registry DriverParameter Value |
|---|---|
| None | ";SDI=None;" |
| Restricted | ";SDI=Restricted;" |
| Limited | ";SDI=Limited;" or no value (i.e., this is the default setting) |
| Full | ";SDI=Full;" |

*FIG. 4*

METHOD AND SYSTEM FOR SECURED DRIVE LEVEL ACCESS FOR STORAGE ARRAYS

FIELD OF INVENTION

The present disclosure relates generally to storage arrays and more particularly to secured access to storage arrays.

BACKGROUND

A storage array is a storage system which includes multiple storage drives. A storage system is attached to a computer system to provide storage for the computer system. Direct attached storage (DAS) is a storage system directly attached to a computer system, without a storage network in between the computer system and the storage system. Network attached storage (NAS) is a file-level storage system connected to a computer network which provides storage access to heterogeneous network clients. A storage area network (SAN) is an architecture to attach remote storage devices (such as disk arrays, tape libraries, and optical jukeboxes) in such a way to computer systems that the storage devices appear as locally attached.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

The present disclosure provides a methodology by which disk level access for storage drives of a storage array may be highly secured based on permission settings that may be applied to the driver interface of the storage drives. Based on specific set of pre-defined access rules, a security component may apply security profiles to permit/deny access to an individual storage drive. The security component may comprise storage controllers of the storage array, an operating system of a computing device communicably coupled to the storage array, or a firmware of the storage drive. The security component may set the storage drive with a first security level. The security component may monitor for a triggering event. When a triggering event occurs, the security component may set the storage drive to a second security access level. The second security access level may be more restrictive than the first security access level. In addition, the security component may generate an alert in response to the triggering event. The alert may be displayed to one or more users of the computing device and may be recorded.

The present disclosure provides disk level access permissions applied at a driver interface layer and permissions applied based on administrator-defined policies. Multiple policies may allow for different access levels. By allowing the setting of storage drives to "no access" levels, the present disclosure provides complete lock-down of data permissions applied on a per-controller, per-operating system, and/or per-drive basis. The present disclosure also allows for management and/or restriction of IO loads and may protect "read-only" data integrity from overwrites.

BRIEF DESCRIPTION OF DRAWINGS

The numerous advantages of the present invention may be better understood by those skilled in the art by reference to the accompanying figures in which:

FIG. 2 is a table illustrating examples of security access levels for system 100, in accordance with an exemplary embodiment of the present invention;

FIG. 3 is a table illustrating individual function calls that are part of a SDI driver stack for system 100, in accordance with an alternative embodiment of the present invention;

FIG. 4 is a table illustrating examples of security access levels when the SDLA functionality is implemented utilizing a Windows operating system, in accordance with an alternative embodiment of the present invention;

DESCRIPTION

Figure 1:
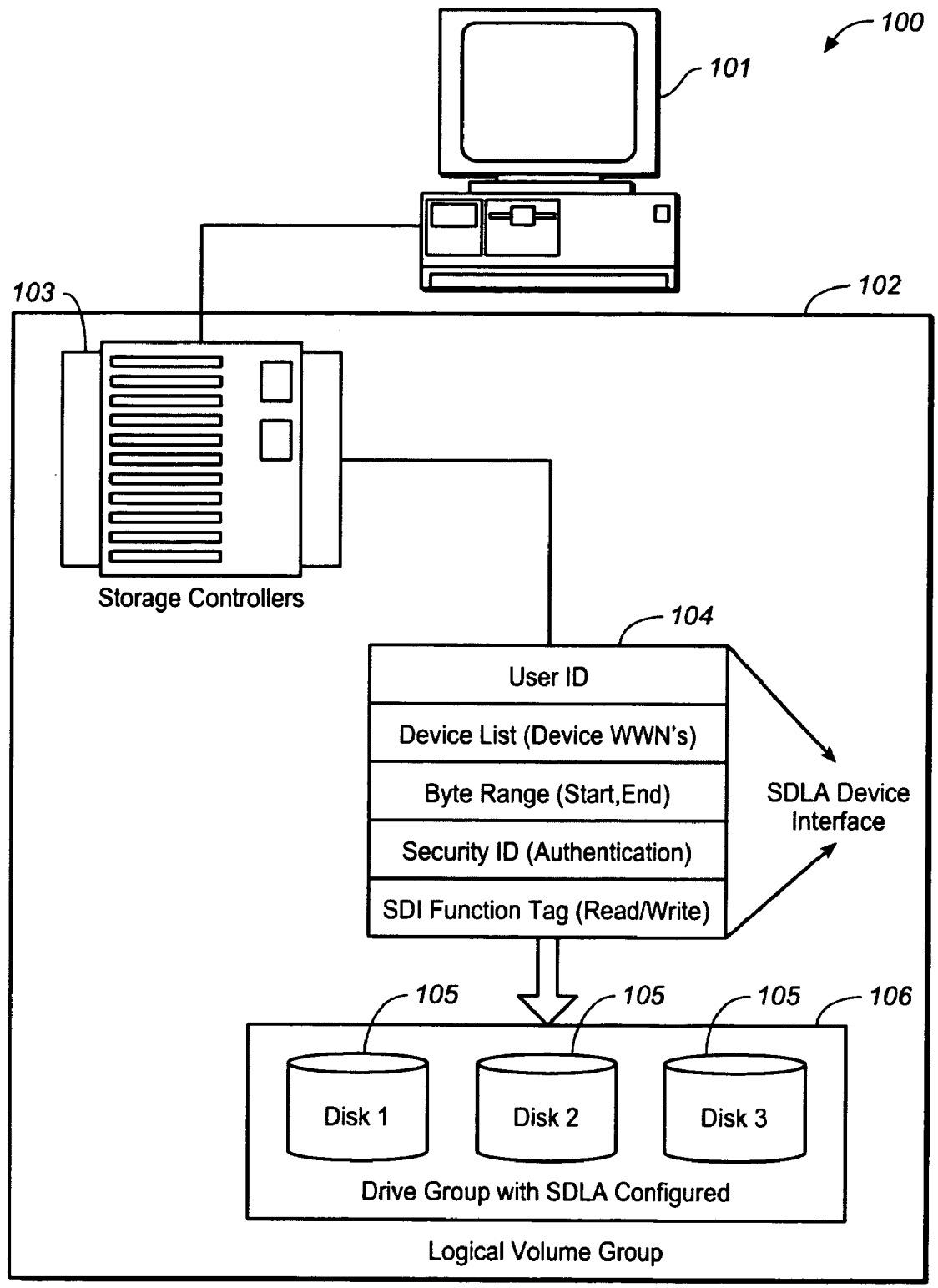
FIG. 1 is a block diagram of a system 100 for securing disk level access for storage drives of a storage array, in accordance with an exemplary embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present disclosure provides a methodology by which disk level access for storage drives of a storage array may be highly secured based on the permission settings that may be applied to the driver interface of the storage drives. The storage array may comprise a storage array such as a LSI-ESG storage array sold by LSI Corporation. The storage drives may comprise serial attached SCSI (small computer system interface) (SAS) storage drives, serial ATA (advanced technology attachment) (SATA) storage drives, and/or Fibre Channel storage drives. The driver interface may comprise a SAS driver interface, a SATA driver interface, and/or a Fibre Channel driver interface.

FIG. 1 illustrates a system 100 for highly securing disk level access for storage drives 105 of a storage array 102, in accordance with an exemplary embodiment of the present invention. The system 100 includes a computing device 101 communicably coupled to a storage array 102. Though this embodiment will be discussed utilizing SAS storage drives 105 and a SAS driver interface (SDI), it should be understood that other types of storage drives 105 and other types of driver interfaces may be utilized without departing from the scope of the present embodiment. Based on specific set of pre-defined access rules, the storage controllers 103 may apply security profiles to permit/deny access to an individual storage drive 105. Based on intended use and the nature of user application, the storage controllers 103 may set storage drives 105 with a first security access level (or a "normal" device security access level) for appropriate user level access (databases, applications, or regular system use). Example security access levels are illustrated in FIG. 2. By utilizing the storage controllers 103 as the security component to apply security profiles and control access, access control may be provided on individual drives 105, and set of drives within a logical volume group 106. While limiting access to a set of storage drives 105 that are part of one logical volume group 106, the storage controllers 105 (initiator) would apply the appropriate security level on the called SDI function (based in intended use case) on all the storage drives 105 that make up the logical volume group 106. This would be at the port-target-volume combination in relation to the SDI function call. The individual function calls that are part of SDI driver stack are illustrated in FIG. 3. Each of these function calls are intended for a specific use criteria, and the security access can be defined at every one of these calls.

The storage controllers 103 may monitor for a triggering event. When a triggering event occurs, the storage controllers 103 may set a storage drive 105 to a second security access level (such as a "limited" security access level or a "restricted" security access level). The second security access level may be more restrictive than the first security access level. For example, the triggering event may comprise an unauthorized access (including, but not limited to, by method, device type, location, and/or user identifier) of a storage drive 105. When access of a particular storage drive 105 is attempted by the computing device 101, the incoming client request, as it comes into the storage array host, may be evaluated based on the port-target-volume-drive pair combination, and the defined access level is then compared against local rules. If the request fails a rule, a device lockdown command is issued. The storage controllers 103 may set the storage drive 105 to a "none" security access level, where no access is permitted to the storage drive 105. This security mechanism would lockdown (act as a kill switch) a single storage drive 105 and/or a multitude of storage drives 105 based on access/security rules applied to the storage controllers 103. This may lock down any access, even authorized access, but for highly-sensitive environments, data may be protected while the security breech is identified and corrected. Alternatively, the triggering event may comprise an error in writing to a storage drive 105. For example, a monitoring program may determine that an "improper" or "corrupted" write to the storage drive 105 has occurred. The monitoring program may issue a write error. In response to the write error, the storage controllers 103 may set the storage drive 105 to a "limited" or "restricted" security level where write access is not permitted to the storage drive 105, but read access may be permitted based on the security policy. This security mechanism would lockdown (act as a kill switch) write access to a single storage drive 105 and/or a multitude of storage drives 105 based on access/security rules applied to the storage controllers 103. Alternatively, the triggering event may comprise an IO (input/output) overload of a storage drive 105. For example, a monitoring program may determine that the storage drive 105 is experiencing an IO overload. The monitoring program may issue an IO overload error. In response to the IO overload error, the storage controllers 103 may set the storage drive 105 to a "limited" or "restricted" security level where write access is not permitted to the storage drive 105, but read access may be permitted based on the security policy. This security mechanism would lockdown (act as a kill switch) write access to a single storage drive 105 and/or a multitude of storage drives 105 based on access/security rules applied to the storage controllers 103. Thus, the storage drive 105 would be freed from the overhead of write requests, reducing the IO overload and allowing the storage drive 105 to process read requests.

In addition to the storage controllers 103 setting a storage drive 105 to a second security access level in response to the triggering event, the storage controllers 103 may generate an alert in response to the triggering event. The alert may be displayed to one or more users of the computing device 101. The alert may be displayed to one or more users of the computing device 101 on a display device of the computing device 101 including, but not limited to a CRT (cathode ray tube) display, a LCD (liquid crystal display) and/or a printer. The alert may also be recorded.

Although the present disclosure has described the storage controllers 103 as applying security profiles to permit/deny access to an individual storage drive 105, setting storage drives 105 with a first security access level, monitoring for a triggering event, setting storage drives 105 with a second security access level in response to the triggering event, and displaying/recording an alert in response to the triggering event, these functions may be performed by another component. For example, an operating system (including, but not limited to, the Windows operating system) of a client computer may function as the security component and perform the above functions, such as when a storage array is configured using JBOD (just a bunch of drives). FIG. 4 illustrates an example of security access levels when the SDLA (secured drive level access) functionality is implemented utilizing a Windows operating system. The access control may be defined at per device level for finer control. For example, when an access request fails to a storage drive based on defined access control, the predefined SDI return codes may be used for triggering the access failure to the user. This in turn may post the following for notification: a critical event entry on the Major Event Log, and/or a needs attention condition on the storage array management software. This may also block further access to by the user to any other devices.

Alternatively, the functions of applying security profiles to permit/deny access to an individual storage drive, setting storage drives with a first security access level, monitoring for a triggering event, setting storage drives with a second security access level in response to the triggering event, and displaying/recording an alert in response to the triggering event, may be performed by a firmware of a storage drive. For example, a storage drive may evaluate all incoming Read and Write requests for the presence of an SDI security command. These commands may be issued such that based on user-level permissions requests presented to the storage drive may be honored or denied. A request may include a permission flag that may signal the drive SDI logic whether to comply. The SDI command options may be directed to a particular sector, block, or LBA (logical block address). The security tag information may be decoded by the firmware of the storage drive in order to authenticate prior to honoring the read/write requests.

Figure 5:
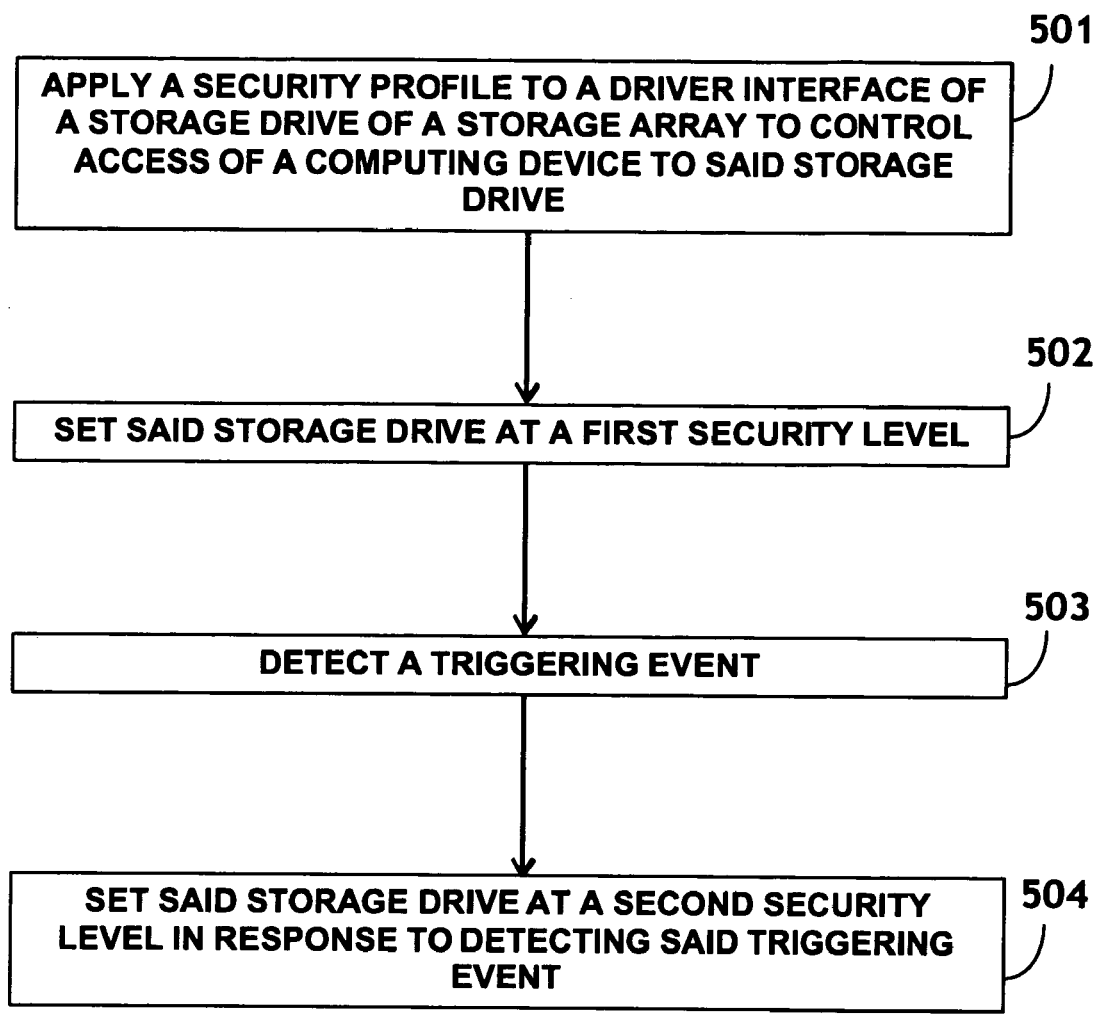
FIG. 5 is a flow chart of a method for sharing of data via a virtual removable volume, in accordance with an alternative embodiment of the present invention.

FIG. 5 illustrates a method 500 of for highly securing disk level access for storage drives of a storage array, in accordance with an alternative embodiment of the present invention. In step 501, apply a security profile to a driver interface of a storage drive of a storage array to control access of a computing device to said storage drive. A storage array controller of said storage array, an operating system of said computing device, and/or a firmware of said storage drive may be utilized to apply said security profile to said driver interface of said storage drive of said storage array to control access of said computing device to said storage drive. In step 502, set said storage drive at a first security level. In step 503, detect a triggering event. In step 504, set said storage drive at a second security level in response to detecting said triggering event, wherein said second security level is more restrictive than said first security level. Said first security level may allow access of said computing device to said storage drive, said triggering event may comprise an unauthorized access attempt of said computing device to said storage drive, and said second security level may not allow access of said computing device to said storage drive. Said first security level may allow write access of said computing device to said storage drive, said triggering event may comprise a write attempt to said storage drive which results in a write error, and said second security level may not allow write access of said computing device to said storage drive but may allow read access of said computing device to said storage drive in accordance with said security policy.

Figure 6:
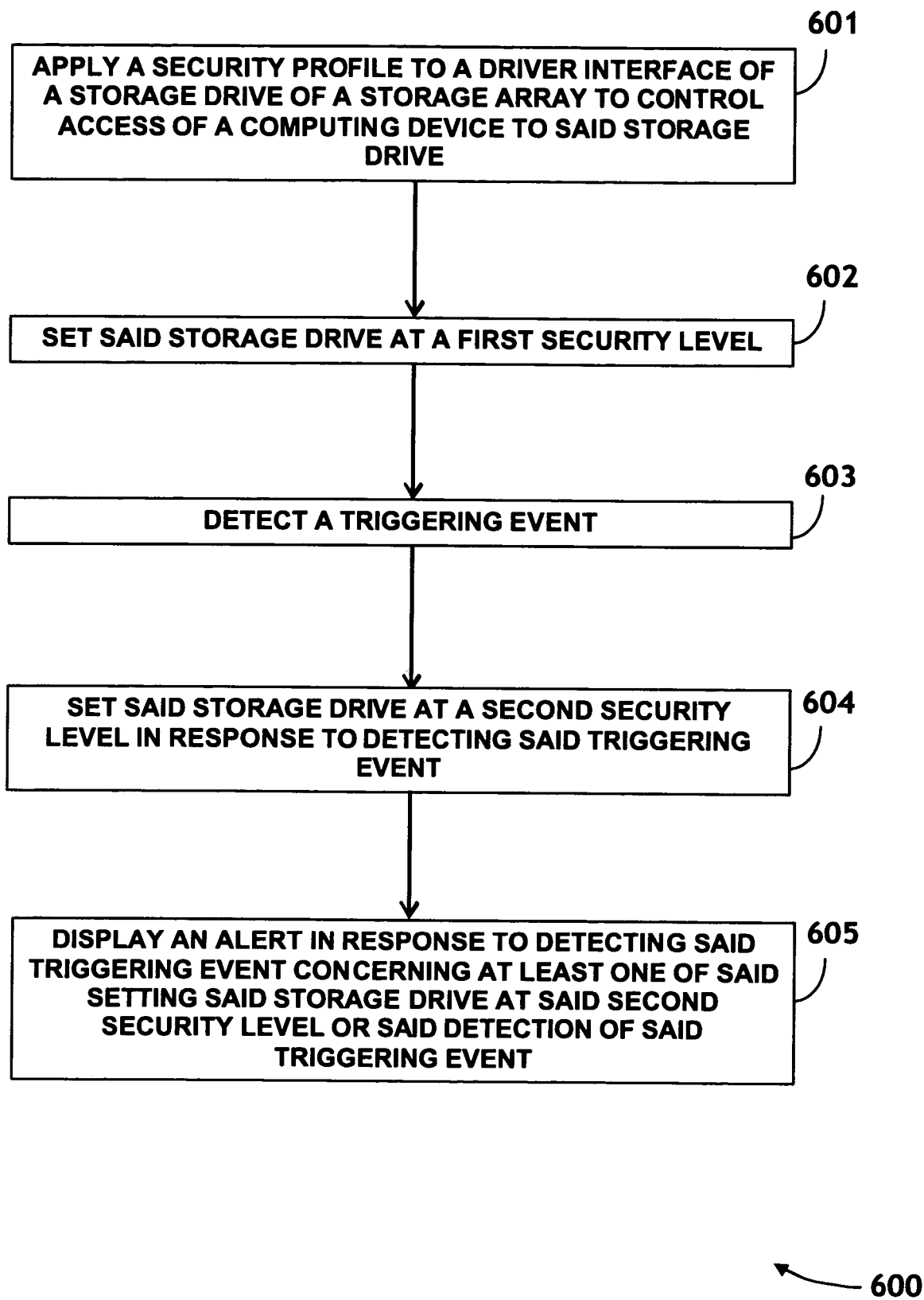
FIG. 6 is a flow chart of a method for sharing of data via a virtual removable volume, in accordance with an exemplary embodiment of the present invention.

FIG. 6 illustrates a method 600 for highly securing disk level access for storage drives of a storage array, in accordance with an alternative embodiment of the present invention. In step 601, apply a security profile to a driver interface of a storage drive of a storage array to control access of a computing device to said storage drive. A storage array controller of said storage array, an operating system of said computing device, and/or a firmware of said storage drive may be utilized to apply said security profile to said driver interface of said storage drive of said storage array to control access of said computing device to said storage drive. In step 602, set said storage drive at a first security level. In step 603, detect a triggering event. In step 604, set said storage drive at a second security level in response to detecting said triggering event, wherein said second security level is more restrictive than said first security level. Said first security level may allow access of said computing device to said storage drive, said triggering event may comprise an unauthorized access attempt of said computing device to said storage drive, and said second security level may not allow access of said computing device to said storage drive. Said first security level may allow write access of said computing device to said storage drive, said triggering event may comprise a write attempt to said storage drive which results in a write error, and said second security level may not allow write access of said computing device to said storage drive but may allow read access of said computing device to said storage drive in accordance with said security policy. In step 604, display an alert in response to detecting said triggering event concerning at least one of said setting said storage drive at said second security level or said detection of said triggering event. The alert may be recorded.

The present disclosure provides disk level access permissions applied at a driver interface layer and permissions applied based on administrator-defined policies. Multiple policies may allow for different access levels. By allowing the setting of storage drives to "no access" levels, the present disclosure provides complete lock-down of data permissions applied on a per-controller, per-operating system, and/or per-drive basis. The present disclosure also allows for management and/or restriction of IO loads (ex: Read-only permissions reduce overhead of write requests) and may protect "read-only" data integrity from overwrites.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method, comprising:
    applying a security profile to a driver interface of a storage drive of a storage array in order to control access of a computing device to said storage drive;
    setting said storage drive at a first security level;
    detecting a triggering event, wherein said triggering event is indicative of corruption or malfunction of said storage drive; and
    upon detection of said triggering event, setting said storage drive at a second security level, wherein said second security level is more restrictive than said first security level.

2. The method as claimed in claim 1, wherein said applying a security profile to a driver interface of a storage drive of a storage array in order to control access of a computing device to said storage drive comprises:
    applying said security profile to said driver interface of said storage drive of the storage array in order to control access of said computing device to said storage drive utilizing a storage array controller of said storage array.

3. The method as claimed in claim 1, wherein said applying a security profile to a driver interface of a storage drive of a storage array in order to control access of a computing device to said storage drive comprises:

applying said security profile to said driver interface of said storage drive of the storage array in order to control access of said computing device to said storage drive utilizing an operating system of said computing device.

4. The method as claimed in claim 1, wherein said applying a security profile to a driver interface of a storage drive of a storage array in order to control access of a computing device to said storage drive comprises:

applying said security profile to said driver interface of said storage drive of the storage array in order to control access of said computing device to said storage drive utilizing a firmware of said storage drive.

5. The method as claimed in claim 1, wherein said triggering event comprises:

an attempt to access said storage drive which is not allowed by said security profile, said first security level allows access of said computing device to said storage drive according to said security policy, and said second security level does not allow any access of said computing device to said storage drive.

6. The method as claimed in claim 1, wherein said triggering event comprises:

an attempt to write to said storage drive which results in an error, said first security level allows write access of said computing device to said storage drive according to said security policy, and said second security level does not allow write access of said computing device to said storage drive.

7. The method as claimed in claim 6, wherein said first security level and said second security level allow read access of said computing device to said storage drive according to said security policy.

8. The method as claimed in claim 1, further comprising:

upon detection of said triggering event, displaying an alert concerning at least one of said setting of said storage drive at said second security level or said detection of said triggering event.

9. The method as claimed in claim 8, wherein upon detection of said triggering event, displaying an alert concerning at least one of said setting of said storage drive at said second security level or said detection of said triggering event comprises:

recording said alert.

10. The method as claimed in claim 1, wherein said driver interface comprises one of a serial ATA (advanced technology attachment) (SATA) driver interface, a serial attached SCSI (small computer system interface) (SAS) driver interface, or a Fibre Channel driver interface and said storage drive comprises one of a SATA storage drive, a SAS storage drive, or a Fibre Channel storage drive.

11. A system, comprising:

a storage array including a storage drive;
a computing device, communicably coupled to said storage array;
a detection component configured to detect a triggering event, wherein said triggering event is indicative of corruption or malfunction of said storage drive; and
a security component configured to apply a security profile to a driver interface of said storage drive of said storage array in order to control access of said computing device to said storage drive and setting said storage drive at a first security level,
wherein said security component sets said storage drive at a second security level, upon detection of said triggering event by said detection component, wherein said second security level is more restrictive than said first security level.

12. The system of claim 11, wherein said security component comprises:

a storage array controller of said storage array.

13. The system of claim 11, wherein said security component comprises:

an operating system of said computing device.

14. The system of claim 11, wherein said security component comprises:

a firmware of said storage drive.

15. The system of claim 11, wherein said triggering event comprises:

an attempt to access said storage drive which is not allowed by said security profile, said first security level allows access of said computing device to said storage drive according to said security policy, and said second security level does not allow any access of said computing device to said storage drive.

16. The system of claim 11, wherein said triggering event comprises:

an attempt to write to said storage drive which results in an error, said first security level allows write access of said computing device to said storage drive according to said security policy, and said second security level does not allow write access of said computing device to said storage drive.

17. The system of claim 11, wherein said first security level and said second security level allow read access of said computing device to said storage drive according to said security policy.

18. The system of claim 11, wherein said security component displays an alert in response to at least one of said detection component detects said triggering event or said security component sets said storage drive at a second security level.

19. The system of claim 18, wherein said security component records said alert.

20. A non-transitory computer-readable medium having computer-executable instructions, for performing a method comprising:

applying a security profile to a driver interface of a storage drive of a storage array in order to control access of a computing device to said storage drive;
setting said storage drive at a first security level;
detecting a triggering event, wherein said triggering event is indicative of corruption or malfunction of said storage drive; and
upon detection of said triggering event, setting said storage drive at a second security level, wherein said second security level is more restrictive than said first security level.

* * * * *